US011630908B2

(12) United States Patent
Yarabolu

(10) Patent No.: US 11,630,908 B2
(45) Date of Patent: Apr. 18, 2023

(54) COGNITIVE SECURITY TOKENS FOR RESTRICTING DATA ACCESS

(71) Applicant: Bank of America Corporation, Charlotte, NC (US)

(72) Inventor: Vijay Kumar Yarabolu, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 383 days.

(21) Appl. No.: 16/931,899

(22) Filed: Jul. 17, 2020

(65) Prior Publication Data

US 2022/0019681 A1      Jan. 20, 2022

(51) Int. Cl.
*G06F 21/62* (2013.01)
*G06F 21/54* (2013.01)
*G06N 5/025* (2023.01)
*G06F 16/17* (2019.01)
*G06F 16/188* (2019.01)

(52) U.S. Cl.
CPC ...... *G06F 21/6218* (2013.01); *G06F 16/1734* (2019.01); *G06F 16/188* (2019.01); *G06F 21/54* (2013.01); *G06N 5/025* (2013.01)

(58) Field of Classification Search
CPC .... G06F 21/6218; G06F 21/54; G06F 21/554; G06F 21/6245; G06F 21/33; G06F 16/1734; G06F 16/188; G06N 5/025; G06N 5/02; G06N 5/04
See application file for complete search history.

(56) References Cited

U.S. PATENT DOCUMENTS

| | | | | |
|---|---|---|---|---|
| 8,584,212 | B1* | 11/2013 | Junod | G06F 21/31 |
| | | | | 726/5 |
| 10,380,489 | B2* | 8/2019 | Ankisettipalli | G06F 40/237 |
| 2004/0243824 | A1* | 12/2004 | Jones | G06F 21/10 |
| | | | | 726/1 |
| 2017/0329991 | A1* | 11/2017 | Van Dyne | H04L 63/20 |
| 2020/0364358 | A1* | 11/2020 | Karia | H04L 63/10 |
| 2021/0084032 | A1* | 3/2021 | Ding | H04L 63/102 |
| 2022/0224685 | A1* | 7/2022 | Dhindsa | G06Q 20/40 |

\* cited by examiner

*Primary Examiner* — Han Yang
(74) *Attorney, Agent, or Firm* — Moore & Van Allen PLLC; James C. Edwards

(57) ABSTRACT

Secure access to data within a communications platform is provided on a need-to-know basis. Inputs provided at the communication platform are intercepted and cognitively analyzed to determine context of the interaction and related data requirements. In response, data access rules are generated and/or retrieved and applied at an access gateway. As data requests as received from the called party from within the communications platform, the data access rules are applied to the request to determine if a match exists and, if so, data access rules-based access is provided to the data. In response to determining the context of the interaction, a context access token is generated and communicated to a virtual database assembler, which assembles a virtual database that only contains data responsive to the context of the interaction.

17 Claims, 7 Drawing Sheets

COGNITIVE SECURITY TOKENS FOR RESTRICTING DATA ACCESS

FIELD OF THE INVENTION

The present invention relates to data security and, more specifically, providing secure access to data on a need-to-know basis while interacting with a communication platform.

BACKGROUND

Typically, when interacting with a communication platform the user is able to access all the information and/or functionality provided by the communication platform. For example, in the call/contact center scenario when an individual calls or otherwise contacts a call/contact center agent requesting some action, the call/contact center agent will verify the identity of the individual caller and, in response, is provided access to all of the individual caller's information that the entity to whom the agent is associated with possesses. Since the call/contact center agent is provided full access to all of the individual caller's information, the possibility exists for illegitimate or negligent data misuse on behalf of the call/contact center agent.

In a further example, when a user accesses a mobile or web-based application, the user is typically provided a user token, which grants full access to all of the functionality and user information (collectively, referred to as resources) that the application offers. As such, in the event that the user token is hijacked or otherwise is controlled by a nefarious entity, the hijacker/nefarious entity can use the all-inclusive user token to control the resource provided by the application.

Therefore, a need exists to develop systems, apparatus, methods, computer program products and the like that address the aforementioned problems. Specifically, a need exists to develop systems and the like that securely limit the amount of resources/data that is available to a user interfacing with a communication platform, such as call/contact center platform, a mobile/web-based application or the like. In this regard, the desired systems and the like, should present information/resources to users on a need-to-know basis, thus eliminating or at least lessening the possibility of the data/resource being misused.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide secure access to data within communication platforms on a need-to-know basis. The communications platforms include, but are not limited to, contact center voice or text chat communication platforms, mobile or web-based applications or the like.

Specifically, embodiments of the invention provide for monitoring inputs provided within a communications platform and cognitively analyzing the inputs to determine data requirements associated with the inputs (e.g., determine user/caller identity and the purpose/context of the interaction within the communication platform). In response to determining what type of data is required to be accessed (i.e., the data requirements), data access rules are generated and/or retrieved from a rules database and communicated to an access gateway. The access gateway receives data requests from the user and/or called party and compares the data request to the data rules to determine whether a match exists, (i.e., whether to provide access rules-based access to the user and/or called party. If the comparison results in no match, the user and/or called party is denied access to the data or further user authentication may be required.

In specific embodiments of the invention, the purpose/context determined from the cognitive analysis of the inputs, provides for generation of a context access token that is communicated to a virtual database assembler. The virtual database assembler accesses the all-inclusive data repository, which stores all of the resources/data associated with the user/caller, retrieves only the data responsive to the context and assembles the virtual database. In such embodiments once the data request is determined to match the data access rules, the user/called party is granted access to only data that is stored in the virtual database. Thus, according to such embodiments of the invention, two levels of data access security are provided. For example, in the event that a data request is able match the data access rules (i.e., first level of data access security), when in fact the data request is outside of the context of the interaction, the user/called party is still not be able to access the requested data since the only data available to the user/called-party is the contextual data stored in the virtual database (i.e., second level of data access security).

A system for providing data access security within a communications platform defines first embodiments of the invention. The system includes a monitoring and cognitive analysis engine having a first memory and one or more first processing devices in communication with the first memory. The first memory stores first instructions that are executable by the one or more first processing devices. The first instructions are configured to monitor inputs provided at a communication platform and, in response, cognitively analyze the inputs to determine data requirements associated with the inputs. In response to determining the data requirements, the first instructions are further configured to create or retrieve data access rules based on the data requirements, and initiate communication of the data access rules to an access gateway. The system further includes the access gateway which includes a second memory and one or more second processing devices in communication with the second memory. The second memory stores second instructions that are executable by the one or more second processing devices. The second instructions are configured to receive the data access rules from the cognitive analysis engine, and, in response to receiving a data request initiated at the communication platform for retrieving data from a data repository, determine whether the data request matches the access rules. In response to determining that the data request matches the access rules, provide rule-based access to data associated with the data request from within the data repository.

In specific embodiments of the system, the first instructions are further configured to generate a context access token that identifies a context of the inputs, and initiate communication of the context access token to a virtual database assembler. In such embodiments the system further includes the virtual database assembler which includes a third memory and one or more third processing devices in communication with the third memory. The third memory stores third instructions that are executable by the one or more third processing devices. The third instructions are configured to, in response to receiving the context access token from the cognitive analysis engine, dynamically assemble a virtual database that only stores data that is responsive to the context of the inputs. In related embodiments of the system, the second instructions configured to provide rule-based access to data associated with the data request are further configured to provide rule-based access to only data stored in the virtual database. In further related embodiments of the system, the second instructions configured to generate the context access token are further configured to generate a plurality of context access tokens, each token being generated based on a change in a context of the inputs during a communication session. In such embodiments of the system, the third instructions configured to assemble are further configured to dynamically assemble a plurality of virtual databases, each virtual database only storing data that is responsive to the context identified in the corresponding one of the plurality of context access tokens. In still further related embodiments of the system, at least one of the access gateway and the virtual database are stored in a fog server within an edge computing environment.

In further specific embodiments of the system, the communication platform is a voice or text chat communication platform, such as a contact center communication platform. In such embodiments of the system, the first instructions configured to monitor are further configured to monitor by listening to the inputs, wherein the inputs are voice or text inputs provided by a calling party and a called party. In addition, the data request is received from the called party (e.g., contact center agent) based on information provided by the calling party. In such embodiments of the system the first instructions configured to cognitively analyze the inputs are further configured to cognitively analyze the voice or text inputs to determine an identity of the calling party and at least one basis for the calling party to initiate a call or text chat with the called party.

In other specific embodiments of the system, the communication platform is a mobile or web-based application. In such embodiments of the system, the first instructions configured to monitor are further configured to monitor the inputs provided by a user within the mobile application or web-based application.

In other specific embodiments of the system, the second instructions are further configured to, in response to determining that the access request does not match the access rules, deny access or request further authentication credentials to gain rule-based access to the data associated with the data request.

Moreover, in further specific embodiments of the system, the first instructions configured to monitor, cognitively analyze and create or retrieve access rules and further configured to continuously monitor, cognitively analyze and create and retrieve access rules throughout an entirety of a communication session, such as that as the inputs change so to do the access rules that are applied at the gateway device.

A computer-implemented method for providing data access security within a communication platform defines second embodiments of the invention. The computer-implemented method is executable by one or more processing devices. The method includes monitoring inputs provided at a communication platform and, in response, cognitively analyzing the inputs to determine data requirements associated with the inputs. The method further includes creating or retrieving data access rules based on the data requirements. Moreover, the method includes, in response to receiving a data request initiated at the communication platform for retrieving data from a data repository, determining whether the data request matches the access rules. Further, the method includes, in response to determining that the data request matches the access rules, providing rule-based access to data associated with the data request from within the data repository.

In specific embodiments the method further includes, in response to cognitively analyzing the inputs, generating a context access token that identifies a context of the inputs and dynamically assembling a virtual database that only stores data that is responsive to the context identified in the context access token. In related embodiments of the method, providing rule-based access to data associated with the data request further comprises providing rule-based access to only data stored in the virtual database.

In specific embodiments of the method, the communication platform is a voice or text chat communication platform. In such embodiments of the method, monitoring further includes monitoring by listening to the inputs, wherein the inputs are voice or text inputs provided by a calling party and a called party.

In other specific embodiments of the method, the communication platform is a mobile or web-based application. In such embodiments of the method, monitoring further includes monitoring the inputs provided by a user within the mobile application or web-based application.

A computer program product including a non-transitory computer-readable code defines third embodiments of the invention. The computer-readable code includes a first set of codes for causing a computer processing device to monitor inputs provided at a communication platform and a second set of codes for causing a computer processing device to cognitively analyze the inputs to determine data requirements associated with the inputs. The computer-readable code additionally includes a third set of codes for causing a computer processing device to create or retrieve data access rules based on the data requirements. In addition, the computer-readable code includes a fourth set of codes for causing a computer processing device to, in response to receiving a data request initiated at the communication platform for retrieving data from a data repository, determine whether the data request matches the access rules. Moreover, the computer-readable code includes a fifth set of codes for causing a computer processing device to, in response to determining that the data request matches the access rules, provide rule-based access to data associated with the data request from within the data repository.

In specific embodiments of the computer program product, the computer-readable code additionally includes a sixth set of codes for causing a computer processing device to, in response to cognitively analyzing the inputs, generate a context access token that identifies a context of the inputs, and a seventh set of codes for causing a computer processing device to dynamically assembling a virtual database that only stores data that is responsive to the context identified in the context access token. In related embodiments of the computer program product, the fifth set of codes is further configured to cause the computer processing device to provide rule-based access to only data stored in the virtual database.

In further specific embodiments of the computer program product the communications platform is a or text chat voice communication platform. In such embodiments of the computer program product, the first set of codes is further configured to cause the computing processor device to monitor by listening to the inputs, wherein the inputs are voice or text inputs provided by a calling party and a called party.

In other specific embodiments of the computer program product, the communication platform is a mobile or web-based application. In such embodiments of the computer program product, the first set of codes is further configured to cause the computing device processor to monitor the inputs provided by a user within the mobile application or web-based application.

Thus, systems, apparatus, methods, and computer program products herein described in detail below provide for secure access to data within a communications platform, such as, but not limited to, a contact center (voice or text chat) communications platform or an online/mobile application communication platform. Specifically, inputs provided at the communication platform are monitored/intercepted and cognitively analyzed to determine data requirements (i.e., a user/calling party and the purpose/context of the interaction). In response to determining the data requirements, data access rules are generated and/or retrieved and applied at an access gateway. As data requests as received from the user/called party from within the communications platform, the data access rules are applied to the request to determine if a match exists and, if so, data access rules-based access is provided to the data. In additional embodiments of the invention, the cognitive determination of the purpose/context of the interaction results in generation of a context access token that is communicated to a virtual database assembler, which assembles a virtual database that only contains data responsive to the context of the interaction. In such embodiments of the invention, once the data request has passed the first level of data access security (i.e., the data request matches the data access rules) the user/called party is provided access only to the data stored in the virtual database (i.e., the second level of data access security).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
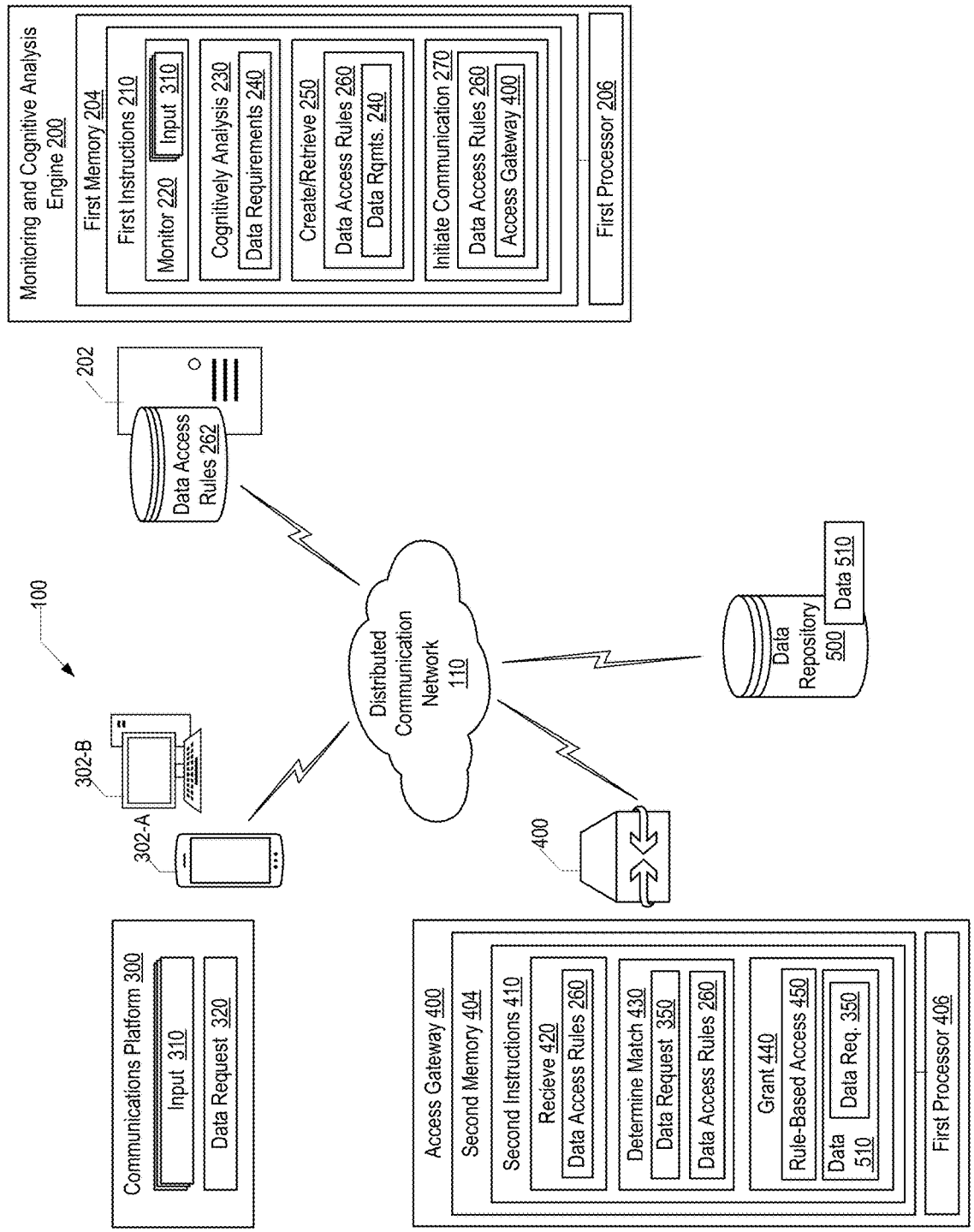
Figure 2:
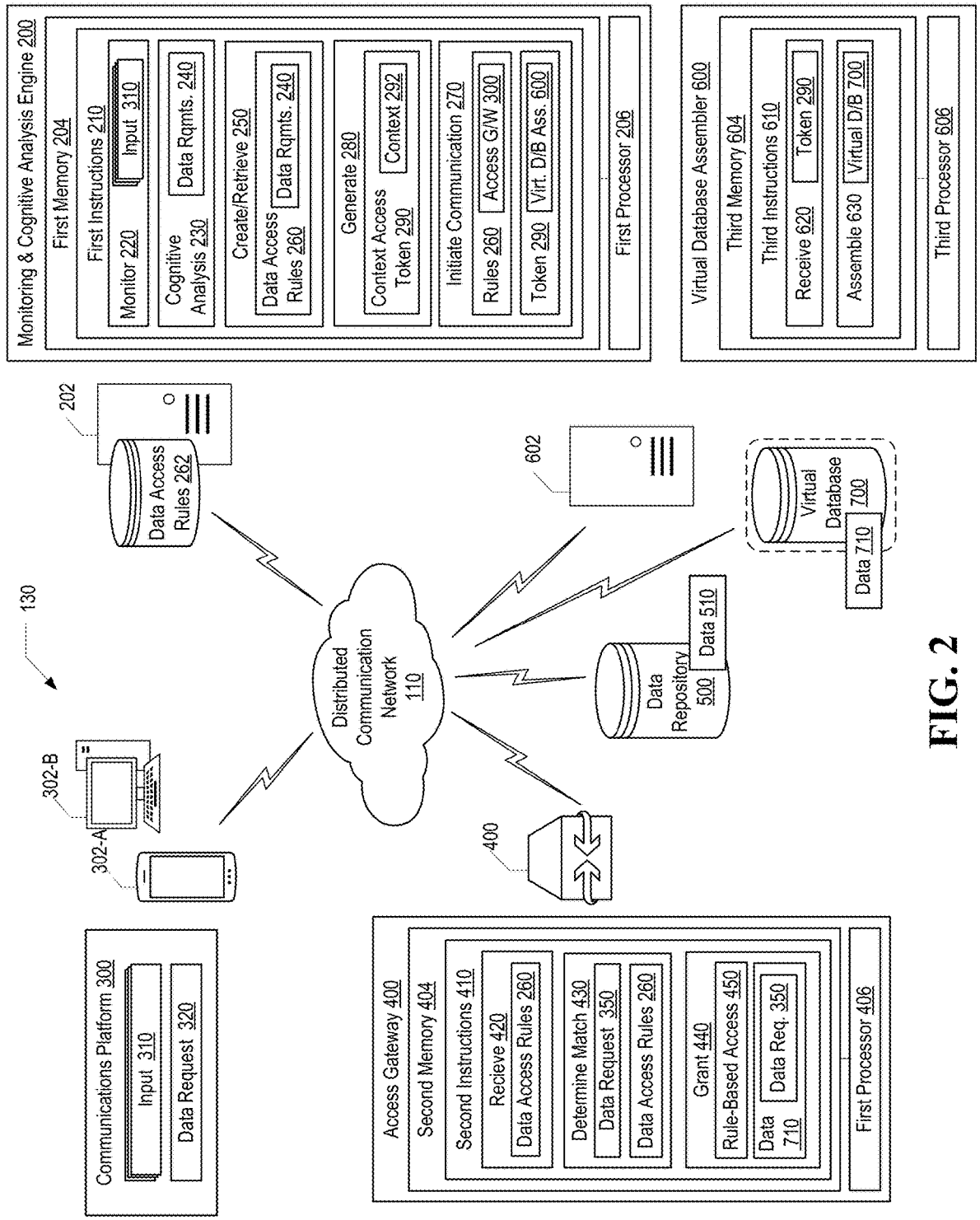
Figure 3:
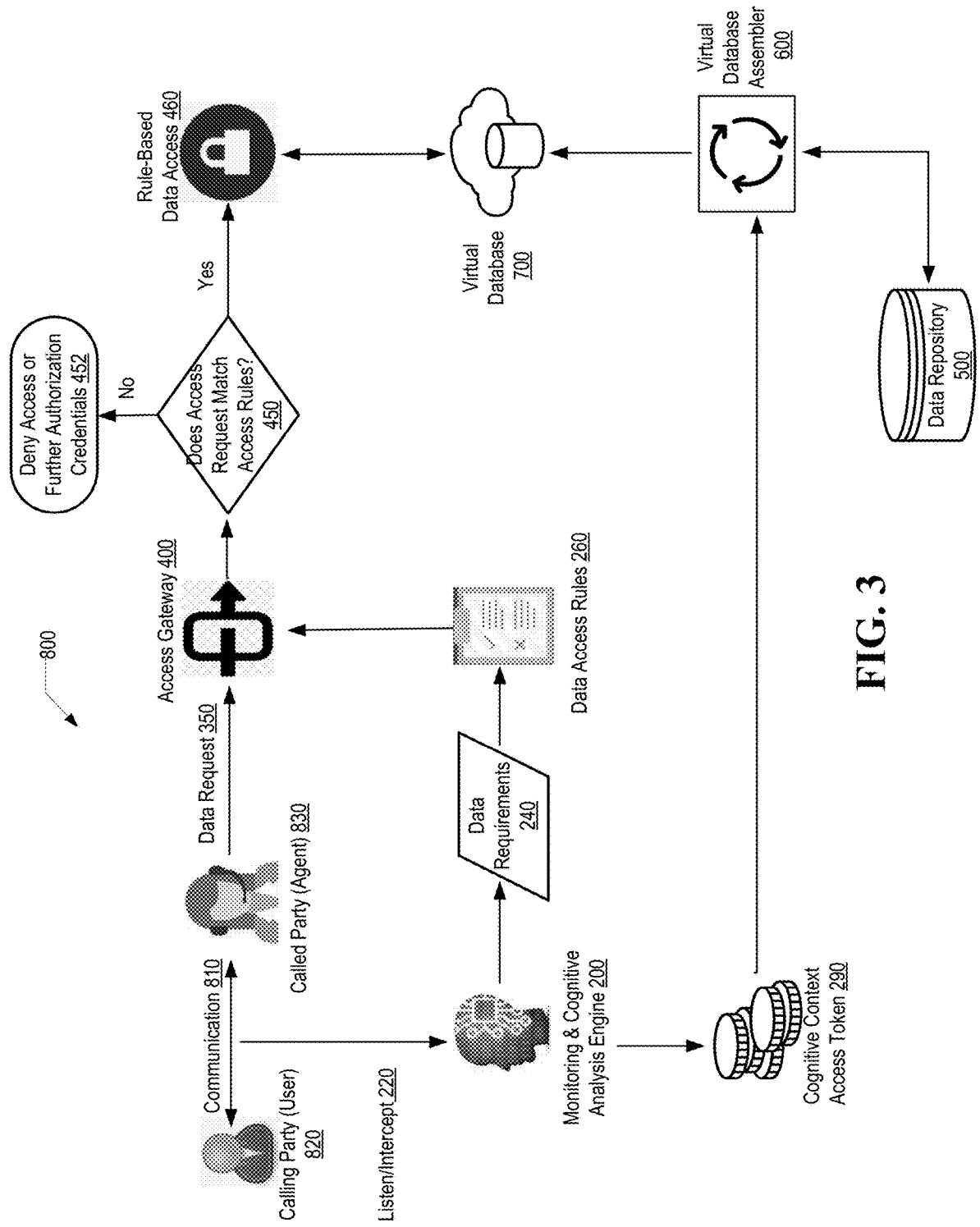
Figure 4:
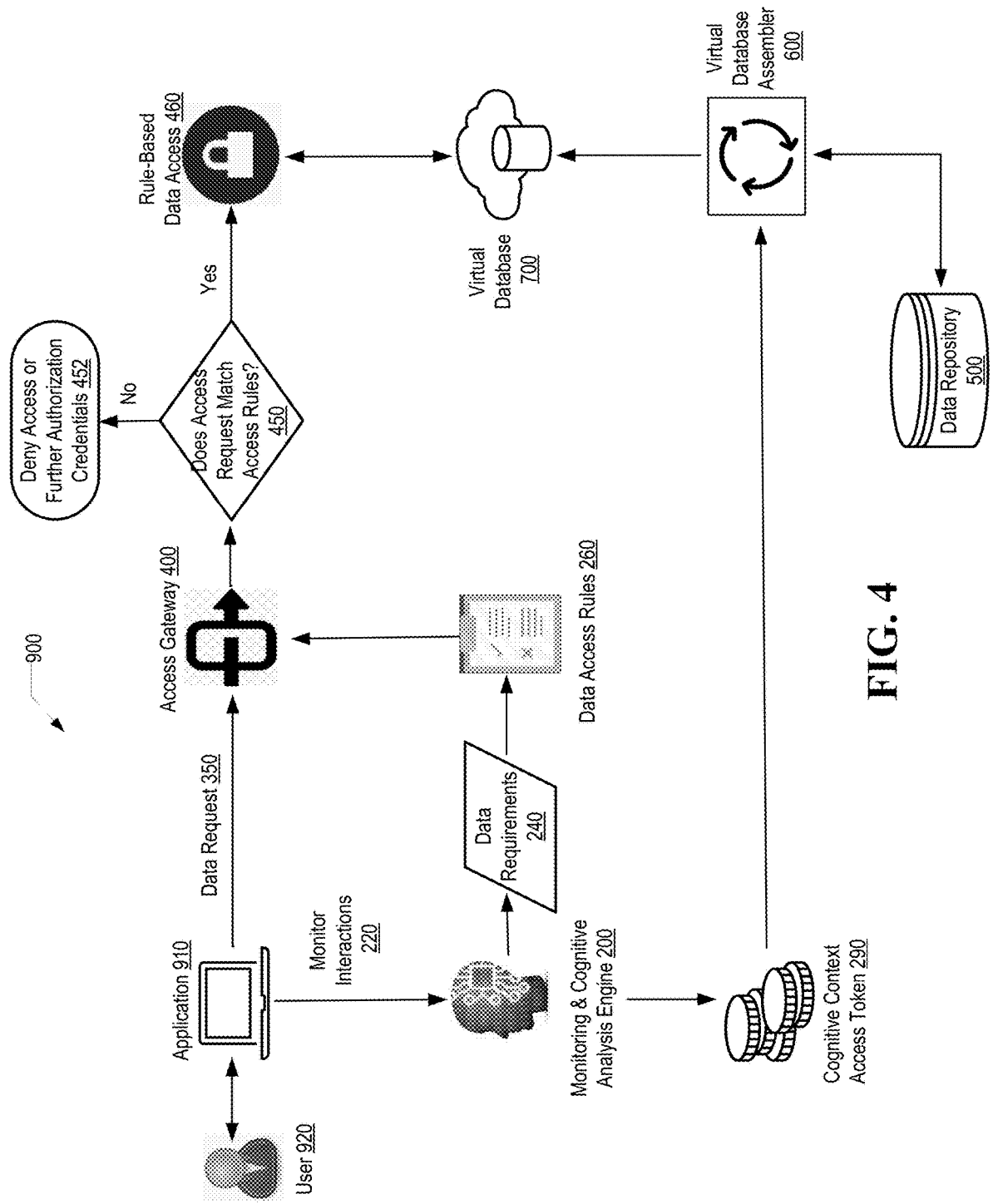
Figure 5:
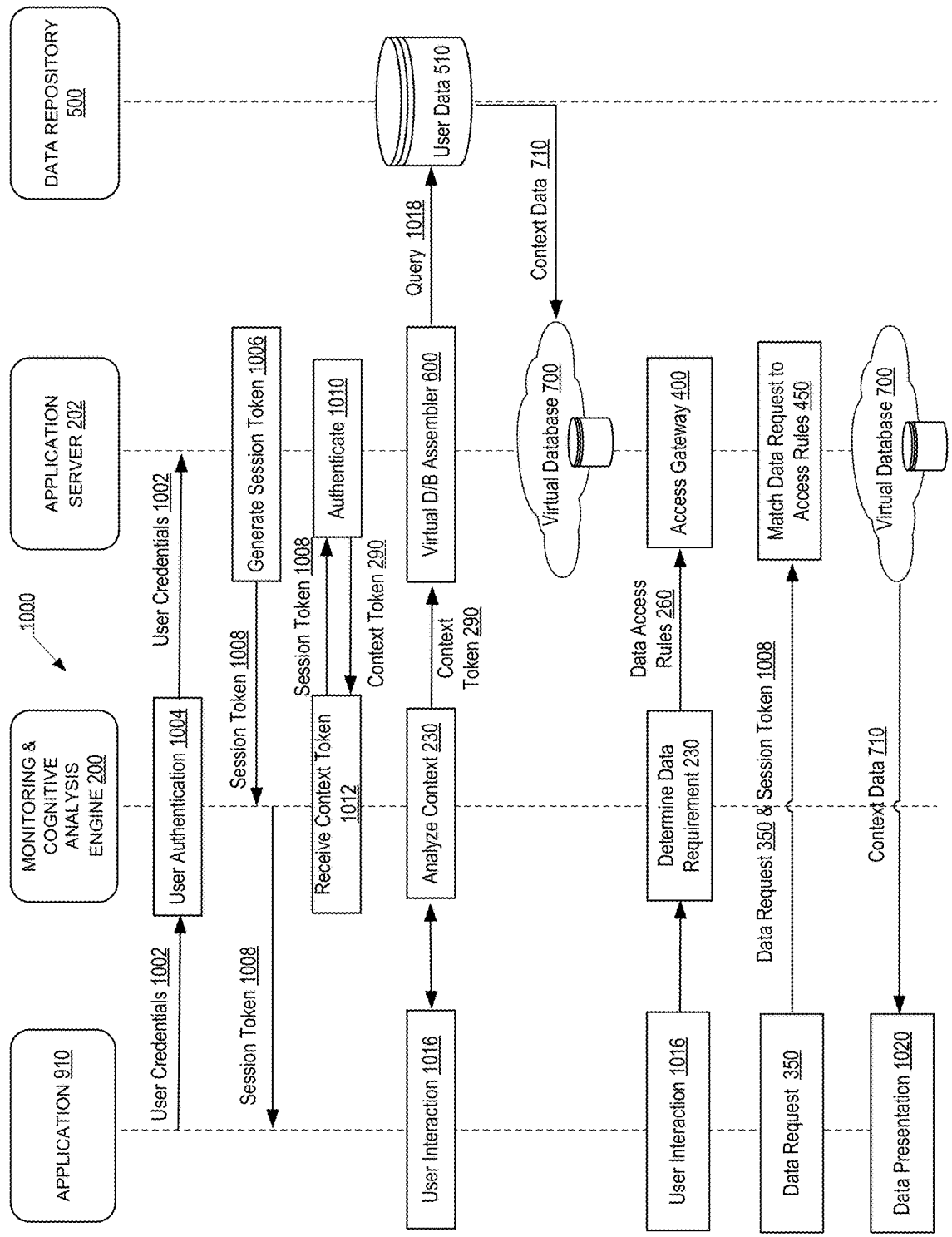
Figure 6:
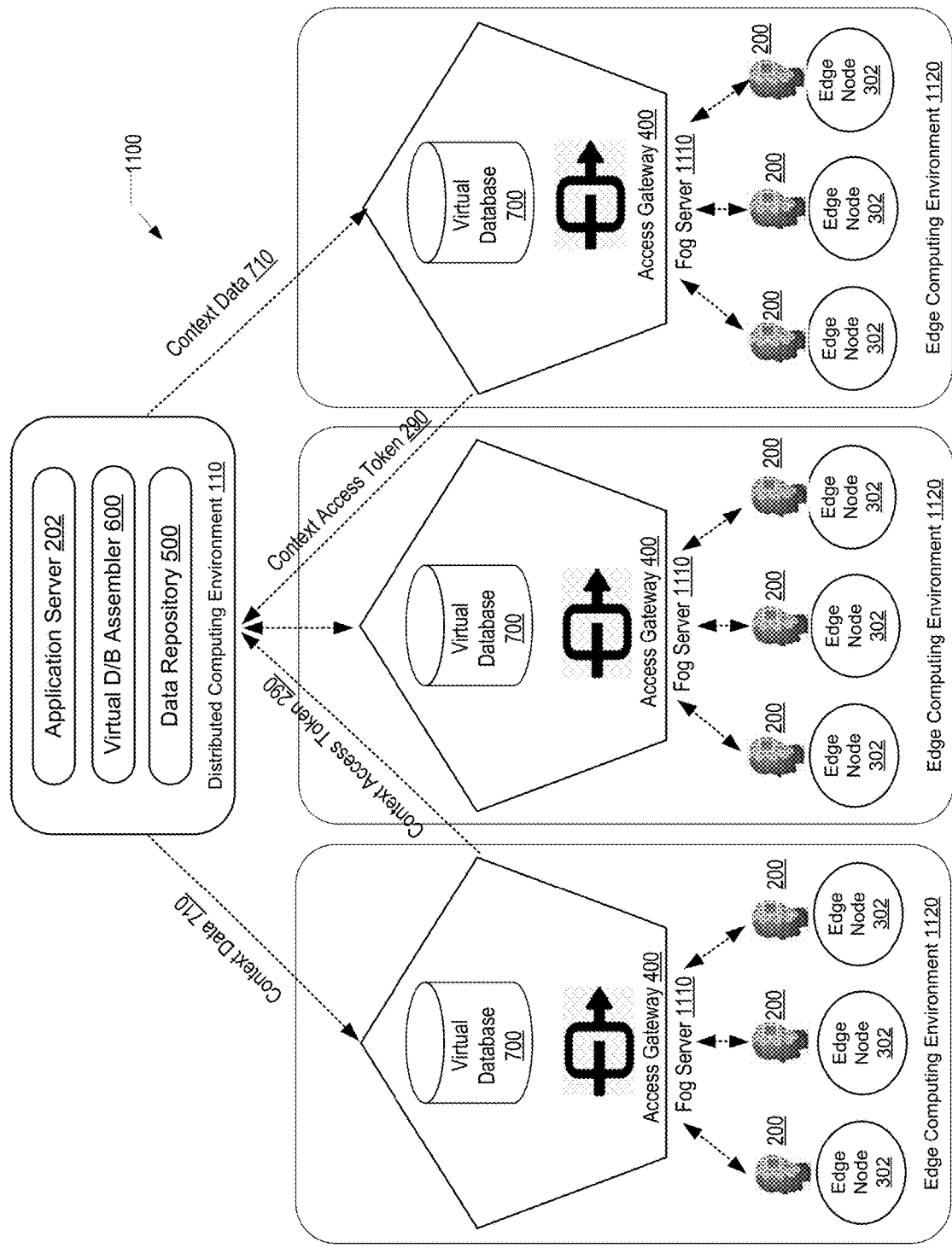
Figure 7:
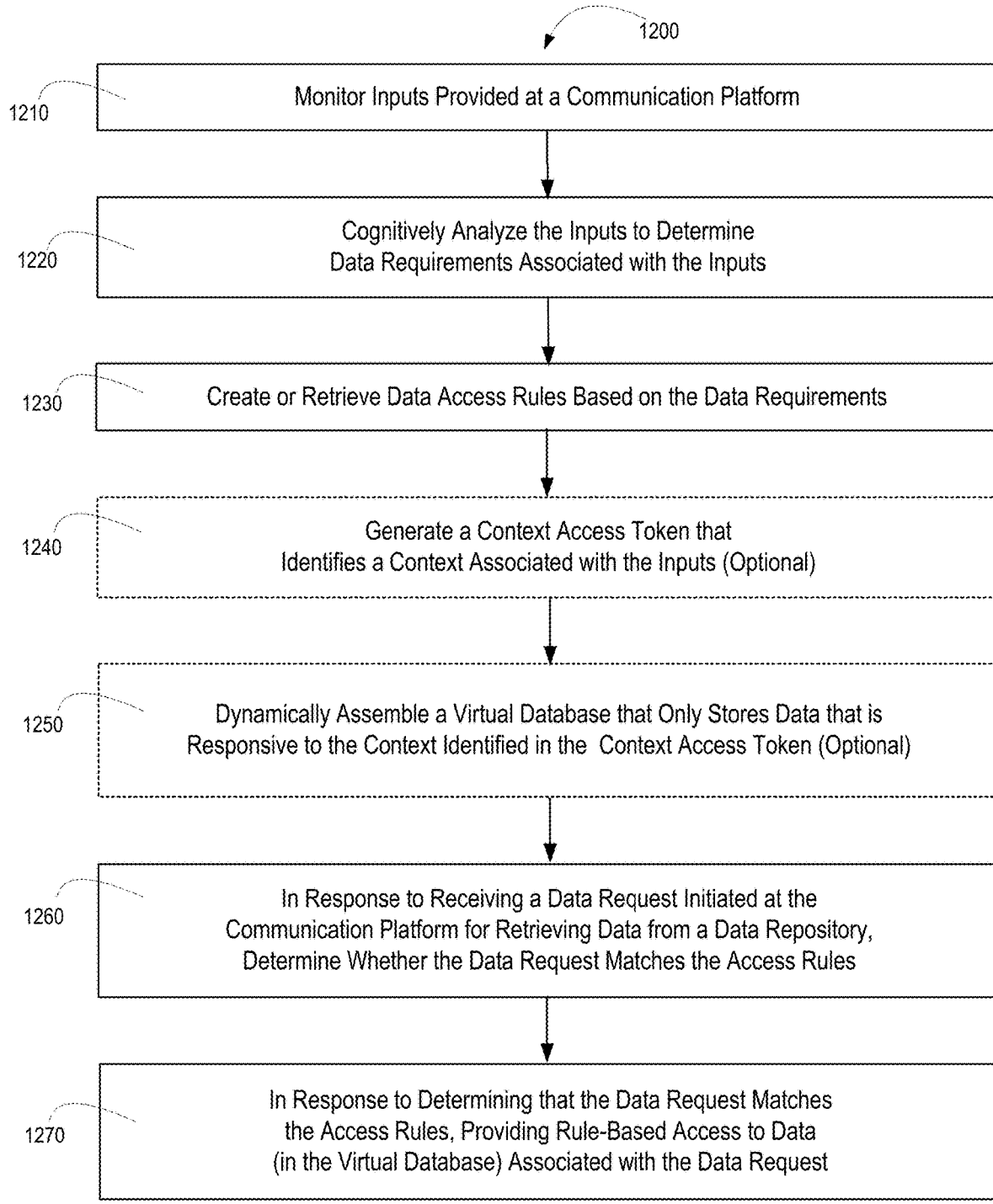

Having thus described embodiments of the invention in general terms, reference will now be made the accompanying drawings, wherein:

FIG. 1 is a schematic diagram of a system for secure access to data resources within a computing platform, in accordance with embodiments of the present invention;

FIG. 2 is a schematic diagram of an alternate system for secure access to data resources, in accordance with embodiments of the present invention;

FIG. 3 is a flow diagram of a method for secure access to data resources within a contact center communication platform (e.g., voice or text chat), in accordance with embodiments of the present invention;

FIG. 4 is a flow diagram of a method for secure access to data resources within a mobile or web-based application, in accordance with embodiments of the present invention;

FIG. 5 is a swim-lane diagram of a method for secure access to data resources within a communications platform, in accordance with embodiments of the present invention;

FIG. 6 is a network diagram of a system for secure access to data resources within a communications platform in which the network benefits from edge computing, in accordance with embodiments of the present invention; and FIG. 7 is a flow diagram of a specific method for securely accessing data within a communications platform, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for provide secure access to data within communication platforms on a need-to-know basis. The communications platforms include, but are not limited to, contact center voice or text chat communication platforms, mobile or web-based applications or the like. As previously discussed, heretofore, such communications platforms have been configured to allow the user or called party to access all of the data resources that the platform has access to (e.g., all of the personal information as well as other resource such as account information, previous interaction/transaction data and the like).

Specifically, embodiments of the invention provide for monitoring/intercepting inputs provided within a communications platform at the onset of the interaction and cognitively analyzing inputs to determine data requirements associated with the inputs (e.g., determine user/caller identity and the purpose/context of the interaction within the communication platform). In response to determining what type of data is required to be accessed (i.e., the data requirements), data access rules are generated and/or retrieved from a rules database and communicated to an access gateway. The access gateway receives data requests from the user and/or called party and compares the data request to the data rules to determine whether a match exists, (i.e., whether to provide access rules-based access to the user and/or called party. If the comparison results in no match, the user and/or called party is denied access to the data or further user authentication may be required.

The inputs are continuously monitored/intercepted throughout the communications sessions, such that, as the purpose/context of the interaction changes and new data requirements become evident, updated new data access rules are dynamically created/retrieved and applied at the access gateway (and data access rules no longer applicable may be removed from the access gateway).

In specific embodiments of the invention, the purpose/context determined from the cognitive analysis of the inputs, provides for generation of a context access token that is communicated to a virtual database assembler. The virtual database assembler accesses the all-inclusive data repository, which stores all of the resources/data associated with the user/caller, retrieves only the data responsive to the context and assembles the virtual database. In such embodiments once the data request is determined to match the data access rules, the user/called party is granted access to only data that is stored in the virtual database. Similar to the data access rules, as the context of the interaction changes throughout a communications session, different context access tokens may generated and communicated to the virtual database assembler, which, in turn, dynamically generates new or updates existing virtual databases based on the changes in the context of the interaction.

Thus, according to such embodiments of the invention, two levels of data access security may be provided. The first level of data access security provided by the data access rules being applied at the access gateway and the second level of data access security provided by the virtual database that stores only data responsive to the context of the communications interaction. Thus, in the event that a data request is able match the data access rules (i.e., the first level of data access security), when in fact the data request is outside of the context of the interaction, the user/called party is still not be able to access the requested data since the only data available to the user/called-party is the contextual data stored in the virtual database (i.e., second level of data access security).

FIG. 1 is a schematic diagram of a system 100 configured for data/resource access security in a communications platform, in accordance with embodiments of the present invention. The system is implemented in a distributed communication network 110, such as, but not limited to, the Internet, one or more intranets, a cellular network, a Public Switch Telephone Network (PSTN) or the like.

The system 100 includes a monitoring and cognitive analysis engine 200 residing on/executing on application server 202. The monitoring and cognitive analysis engine 200 includes a first memory 204 and at least one first processor 206 in communication with the first memory 204. The first memory 204 stores first instructions 230 that are configured to monitor 220 or intercept/record inputs 340 received from communications platform 300 executing on user device 302-A and/or computing workstation 302-B.

The communications platform 300 may be any platform that provides a user or a called party (e.g., agent) access to a user's or calling party's data/resources. For example, the communications platform 330 may include a contact center communications platform, such as voice call, text/chat in which a calling party contacts a called party to perform an interaction that requires the called party to access calling party data. In other embodiments of the communications platform 300 may be online or mobile application in which a user accesses the application and performs an interaction which requires access to user data/resources. Thus, the inputs 310 may be the voice or text inputs provided by both the calling and called party during a contact center call or chat session or the computer inputs provided by a user to an online or mobile application.

In response to monitoring 220 the inputs 310, the first instructions 210 are configured to perform cognitive analysis 230 on the inputs 310 to determine data requirements 240 for the interaction. In specific embodiments of the system 100, the cognitive analysis 230 may identify the user/calling party and determine the purpose/context of the interaction. Such cognitive analysis 230 initially occurs at the onset of the communication, such as, when the calling party initiates the voice call or chat session and provides identity verification data or logs on to an online or mobile application.

In response to determining the data requirements 240, first instructions 210 are further configured to create and/or retrieve 250 data access rules 260 responsive to the data requirements 240. In specific embodiments of the system 100, data access rules 260 may be retrieved from data access rules database 262 or if the embodiment does not employ a rules database 262 or the database 262 does store a specific rule the rule(s) may be dynamically created. Once the rules 260 have been created and/or generated 250, first instructions 210 are further configured to initiate communication 270 of the data access rules 260 to an access gateway 400.

The system additionally includes the access gateway 400, which may comprise a standalone apparatus or be embodies in a multi-purpose apparatus/server is in distributed communication network 110 communication with the monitoring and cognitive analysis engine 200 and the communication platform 300. In specific embodiments of the invention, access gateway 400 is an integrated portion of the communications platform 300, and, a such, may reside in the same apparatus/server as the communications platform, while in other embodiments of the invention, the access gateway 400 may be included in a standalone apparatus. The access gateway 400 includes a second memory 404 and at least one second processor 406 in communication the second memory 404. The second memory stores second instructions 410 that are executable by the processor(s) 406. The second instructions 410 are configured to receive 420 the data access rules 260 from the monitoring and cognitive analysis engine 200 and apply the rules 260 to any data request 350 received from the communication platform 330, such as a data request 350 made by a called party (e.g., agent) within a contact center voice call or text chat communications platform 300 or a user within an online or mobile application communication platform 300.

Second instructions 410 are further configured to, in response to receiving the data request 350 from the communications platform 300, compare the data access request 350 to the data access rules 260 to determine whether a match 430 exists for the data request 350 and one or more of the data access rules 260. A match may indicate whether the data request 350 is approved or, in other embodiments of the invention, whether the data request 350 is denied. In response to the determining that a match exists that is configured to provide access, the second instructions 410 are configured to grant 440 rule-based access to data 510 associated with the data request 350 that is stored in data repository 500.

It should be noted that the first instructions 210 are configured to continuously monitor/intercept 220 the inputs 310 throughout an entirety of a communication session. As such, once the cognitive analysis 230 determines that the purpose/context, i.e., data requirements 240 have changed, first instructions 210 are configured to create/retrieve 250 new or updated data access rules 260 and initiate communication 270 of the updated/new rules 260 to the access gateway 400. In response to receiving the updated/new access rules 260, the access gateway 400 is configured to apply the updated/new access rules 260 to new data requests 350 and, in some instances revoke/delete the previously applied data access rules 260.

Referring to FIG. 2 a schematic diagram is depicted of alternate system 130 for providing secure data access within a communications platform 300, in accordance with alternate embodiments of the present invention. In accordance with the embodiments described in relation to FIG. 2, the first instructions 210 of the monitoring and cognitive analysis engine 200 are further configured to generate 280 a context access token 290 that identifies the context 292 of the communication interaction (i.e., the interaction between the calling party and the called party of a voice or text chat communication or the interaction of a user with an online or mobile application). Further, the first instructions are further configured to communicate the context access token 290 to a virtual database assembler 600.

In such embodiments the system 120 further includes a virtual database assembler 600, which that includes a third memory 604 that is in communication with at least one third processor 606. The third memory stores third instructions 610 that are executable by the third processor(s) 606. Third instructions 610 are configured to receive 620 the context access token 290 from the monitoring and cognitive analysis engine 200 and, in response assemble 630 a virtual database 700 that stores data 710 that is responsive to the context 292 identified in the context access token 290. The virtual database 700 may be assembled by sending queries to the data repository 500 that requests specific data, i.e., data 710 that is responsive to the context 292 identified in the context access token 290.

In such embodiments of the invention, once the second instructions 410 of access gateway 400 grant 4440 rule-based access to the data, the data 710 that is accessed is only the data 710 stored in the virtual database 700.

It should be noted that the first instructions 210 are configured to continuously monitor/intercept 220 the inputs 310 throughout an entirety of a communication session. As such, once the cognitive analysis 230 determines that the purpose/context, i.e., data requirements 240 have changed, first instructions 210 are configured to generate 280 new or updated context access tokens 290 and initiate communication 270 of the updated/new tokens 290 to the virtual database assembler 600. In response to receiving the updated/new context access tokens 290, the virtual database assembler 600 is configured to assemble an updated or new virtual database 700 and, in some instances revoke/delete the previously assembled virtual databases 700.

Thus, according systems 120 described in relation to FIG. 2 dual level data access security is provided, in which the data access rules 260 provide for a first level of access security and the virtual database 700 provides for the second level of access security. In such embodiments of the system 102 if an data request 250 is able to circumvent the data access rules 260 applied at the access gateway 400 (e.g., the data request erroneously matches approval access rules 250), the request is still limited to accessing data in the virtual database 700. Since data 710 in the virtual database 700 is limited to data that is responsive to the context of the interaction, the data request 250 that erroneously passed through the access gateway 400 (i.e., met the access rules 260) is unlikely to be fulfilled since the virtual database 700 will not contain data responsive to the data request 250.

Referring to FIG. 3, depicted is flow diagram of a method 800 for data/resource access security within a contact center communication 810, in accordance with embodiments of the present invention. The communication 810, which may be a voice call, a text chat or the like is initiated by a calling party/user 820 who calls or otherwise initiates a text chat session with a called party/agent 830 associated with an entity, such as a merchant, government agency, financial institution or the like.

The monitoring and cognitive analysis engine 200 listens/intercepts 220 the communication 810 between the calling party 820 and the called party 830. The listening/interception 220 occurs at the onset of the communication 810 when the called party/agent 830 is verifying the identity of the calling party/user 820 and attempting to determine the purpose for the calling party's call/text chat session. Additionally, listening/interception 220 may occur throughout the communication 810, such that, the monitoring and cognitive analysis engine 200 may determine changes in the communication 810 context.

In response to listening/intercepting 220 the communication 810, the monitoring and cognitive analysis engine 200 is configured to cognately analyze the communication 810 to identify the calling party user 820 and the purpose/context of the communication 810, which defines the data requirements 240 for the communication 800. In response to determining the data requirements 240, the monitoring and cognitive analysis engine 200 is configured to create and/or retrieve data access rules 260 that define the parameters for the called party agent/830 to access calling party/user 820 data that is stored in the data repository 500 (e.g., entity/merchant/financial institution storage, including customer summary data, account data, previous transaction/interaction data and the like). The data access rules 260 are subsequently communicated to and applied at the access gateway 400. Continuously listening/interception 220 throughout the entirety of the communication 810, allows for the data requirements to change and, as a result, new or updated data access rules 260 may be created/retrieved to reflect the change in data requirements 240 and communicated to the access gateway throughout the communication 810.

Additionally, in response to listening/intercepting 220 the communication 810, the monitoring and cognitive analysis engine 200 is configured to generate a context access token 290 that identifies the context/purpose of the communication 810. The token 290 is communicated to the virtual database assembler 600, which is configured to assemble virtual database 700 by generating context-specific queries to the data repository 500, which returns context-specific user/calling party data. The context-specific user/calling party data/resources are the only data/resources stored within the virtual database 700.

During the communication 810, the called party 830 submits a data/resource request within the communication platform, (e.g., the voice call or text chat communication platform) and the access gateway 400 determines whether a match 450 exists between the data access rules 260 and the data request 350. If the determination is made that no match exists between the data access request 350 and the data access rules 260, the request 350 is denied or further calling party/user authorization credentials are required to be provided. If the determination that that the data access request 350 matches the data access rules 450, rule-based data access 460 is granted and data that is responsive to the request is retrieved from the virtual database 700 and provided to the called party/agent 830 via a graphical user interface (GUI) provided within the communication platform.

Referring to FIG. 4, a depicted is flow diagram of a method 900 for data/resource access security within an online or mobile communication 910, in accordance with embodiments of the present invention. The online or mobile application, which may be a merchant application, government agency application, a financial institution application provides for the user 920 to perform various interactions in response to provide inputs. Typically, once a user accessing such an application is authenticated, the user is provided access to all of the user resources (e.g., data and functionality) provided by such an application 910. However, according to the present invention, access to data and, in some embodiments, functionality is limited to only the data or functions that are requested by the user 920.

The monitoring and cognitive analysis engine 200 monitors 220 the user interactions with the application 910 (i.e., the inputs that the user 920 provides to the application 910). The monitoring 220 occurs at the onset of the user's session with the application, when the user 920 is verifying their identity and initially making inputs that identify the intent/purpose of the session. Additionally, monitoring 220 may occur throughout the user session, such that, the monitoring and cognitive analysis engine 200 may determine changes in the user's purpose/context during the user session.

In response to monitoring 220 the user session, the monitoring and cognitive analysis engine 200 is configured to cognately analyze the user interactions to identify the user 920 and the purpose/context of the user session, which defines the data requirements 240 for the user session. In response to determining the data requirements 240, the monitoring and cognitive analysis engine 200 is configured to create and/or retrieve data access rules 260 that define the parameters for the user to request data/resources from the application 910. The user's data/resources are stored in data repository 500 (e.g., entity/merchant/financial institution storage, including customer summary data, account data, previous transaction/interaction data and the like). The data access rules 260 are subsequently communicated to and applied at the access gateway 400. Continuously monitoring 220 throughout the entirety of the user session allows for the purpose/context of the user session to change, i.e., the data requirements to change and, as a result, new or updated data access rules 260 may be created/retrieved to reflect the change in data requirements 240 and communicated to the access gateway throughout the user session.

Additionally, in response to monitoring 220 the interactions provided during the user session, the monitoring and cognitive analysis engine 200 is configured to generate a context access token 290 that identifies the context/purpose of the user session. The token 290 is communicated to the virtual database assembler 600, which is configured to assemble virtual database 700 by generating context-specific queries to the data repository 500, which returns context-specific user data/resources. The context-specific user data/resources are the only data/resources stored within the virtual database 700.

During the user session, the user 910 submits a data/resource requests within the communication platform, (e.g., the online or mobile application 910) and the access gateway 400 determines whether a match 450 exists between the data access rules 260 and the data request 350. If the determination is made that no match exists between the data access request 350 and the data access rules 260, the request 350 is denied or further user authorization credentials are required for data access. If the determination that that the data access request 350 matches the data access rules 450, rule-based data access 460 is granted and data that is responsive to the request is retrieved from the virtual database 700 and provided to the user 830 via a graphical user interface (GUI) provided within the mobile or online application 910.

Referring to FIG. 5 a swim-lane flow diagram is presented of a method 100 for secure data access within a mobile or online application, in accordance with embodiments of the present invention. Embodiments described in relation to FIG. 5 provide for additional details/embodiments, which are described in relation to FIG. 4.

Initially a user access online or mobile application 910 and as a means of authentication provides user credentials 1002, such as username, passcode, biometric data or the like, to the monitoring and cognitive analysis engine 200. In the embodiment described in relation to FIG. 5, the monitoring and cognitive analysis engine 200 is configured to perform user authentication 1004, which may require network communication to compare the received user credentials 1002 with the known user credentials. In response to successful user authentication 1004, the user credentials 1002 are communicated to an application server 202, which is configured to generate a session token 1006 for the user session, which is communicated back to the application 910 through the monitoring and cognitive analysis engine 200. Additionally, the monitoring and cognitive analysis engine 200 communicates the session token 1008 to the application server 202, which authenticates 1010 the session token and, in response communicates a context token 290 to the monitoring and cognitive analysis engine 200.

In response to user interactions 1016 at the application 910, the monitoring and cognitive analysis engine 200 analyzes 230 the user interactions to determine the context of the interactions and identifies the context within the context token 290, which is subsequently communicated to the virtual database assembler 600 within the application server 202. The virtual database assembler 600 communicates queries 1018 to the data repository 500 to retrieve context-specific data 710 from the user data 510 portion of the data repository/database 500. The context data 710 is communicated to the virtual database assembler 600, which is configured to assemble the virtual database, which is limited to the context data 710.

Further, in response to user interactions 1016 at the application 910, the monitoring and cognitive analysis engine 200 determines data requirements 230 and related data access rules are created and/or retrieved, which are communicated to the access gateway 400 at the application server 202. Once a data request 350 is made by the user at the application 910, the data request 350 and the session token 1008 are communicated to the access gateway 400 to determine whether a match 450 exists between the data request 350 and data access rules 260. In response to determining that a match exists between the data request 350 and data access rules 260, access rule-based access is granted, and context data 710 data is retrieved from the virtual database 700 and communicated back to the application 910 for data presentation 1020.

Referring to FIG. 6, a schematic diagram is provided of a network computing environment 1100 for implementing secure data access within an online or mobile application communication platform, in accordance with embodiments of the present invention. Specifically, as depicted the network computing environment 1100 employs edge computing environments 1120. Edge nodes 302, otherwise referred to as user devices may comprise Personal Computers (PCs) or mobile devices, such as smart phones, laptop computers or the like. The edge nodes 302 are configured to execute the monitoring and cognitive analysis engine 200. The edge nodes are in network communication with fog server 1110 which also resides within the edge computing environment 1120. The fog servers 1110 are configured to execute the access gateway 400 and store the virtual database 700.

In practice, the monitoring and cognitive analysis engine 200 monitors interactive inputs provided by the user, determined the purpose/context of the interactions/inputs and generates a context access token 290 that identifies the context of the interactions/inputs. The context access token is communicated, via the fog server 1110, to the virtual database assembler 600, which resides in the distributed communication network 110 (e.g., the Internet or the like).

The virtual database assembler 600 sends queries to the data repository 500 to retrieve context data 710 that is responsive to the context identified in the context access token 290. The context data 710 is then communicated to the virtual database 700, residing in the fog server 1110. It should be noted that the virtual database 700 is configured to have the same schema as the data repository/database 500 to allow for data to be retrieved from the virtual database 600 in the same manner as the data repository/database 500.

Additionally, the monitoring and cognitive analysis engine 200 determines data requirements 240 (not shown in FIG. 6) and provides the access gateway 400 with data access rules 260 (not shown in FIG. 6) based on the identified data requirements 240.

In response to the user submitting a data request 350 (not shown in FIG. 6) to the application at the edge node 302, the data request 350 is communicated to the access gateway 400 to determine whether the data request 350 meets the data access rules 260. In response to determining that the data request 350 meets the data access rules 260, context data 710 from the virtual database 700 is retrieved and returned to the edge node 302 for presentation to the user via the application. Since both the access gateway 400 and the virtual database 700 reside on the fog server 1110, both the decisioning on data requests 350 (i.e., determining whether the data request 350 meets the data access rules 260) and the retrieval of context data 710 occur in the edge computing environment 1120. This means that both the decisioning on data requests 350 and the retrieval of context data 710 in a highly efficient and timely manner, which eliminates the need to communicate with the application server 202 and/or data repository 500 residing within the distribute communication network 110.

Referring to FIG. 7, a flow diagram is presented of a method 1200 for secure data/resource access within a communications platform, in accordance with embodiments of the present invention. At Event 1210, inputs provided at a communication platform are monitored. In those embodiments in which the communications platform is a contact center, such as call or text chat, monitoring involves listening/intercepting the voice or text inputs provided by both the calling party/user and the called party/agent. In those embodiments of the invention, in which the communications platform is an online or mobile application, monitoring involves monitoring/receiving all of the interactions/inputs made by the user as they interface with the application. As previously discussed, at a minimum the monitoring occurs at the onset of the communication session, while in other embodiments of the method, the monitoring occurs through the entirety of the communication session so as to allow for changes in the purpose/context of the interactions/inputs.

At Event 1220, the inputs are cognitively analyzed to determine data requirements associated with the inputs. In this regard, the inputs may be cognitively analyzed to identify the user and purpose/context of the inputs/interactions and, subsequently, the data requirements associated therewith are determined. At Event 1230, data access rules are created or retrieved based on the determined data requirements. In specific embodiments of the method, the data access rules may be retrieved from a data access rules database that stores predetermined access rules, while in other instances, if the database does not exist or the rule does not exist in the database, the rule(s) may be dynamically created. Additionally, at a minimum the data requirements and data access rules will be determined at the onset of the communication session, while in other embodiments of the method, the data requirements and data access rules are determined dynamically throughout the entirety of the communication session in the event the purpose/context of the interactions/inputs change.

At optional Event 1240, cognitive analysis of the inputs results in generation of a context access token that identifies the context associated with the interactions/inputs. At optional Event 1250, a virtual database is dynamically assembled that is limited to storing data that is responsive to the context identified in the context access token. At a minimum the context access token is generated and the virtual database is assembled at the onset of the communication session, while in other embodiments of the method, the context access tokens are generated and virtual databases are assembled (or re-assembled) dynamically throughout the entirety of the communication session in the event the purpose/context of the interactions/inputs change.

At Event 1260, in response to receiving a data request initiated at the communication platform, a determination is made as to whether the data request matches/meets the data access rules. At Event 1270, in response to determining that the data request does meet/match the data access rules, rule-based access to data is granted. If it is determined that the data request does not meet or match the data access requests, access to data is denied or, in some embodiments, further authentication credentials may be required to access the data. In those embodiments of the method, in which the virtual database is assembled, such granting of rule-based access provided for context data to be retrieved from the virtual database. In such embodiments the data access provides for dual level security; first the data request must meet/match the data access rules, which were generated based on the specific data requirements determined for the interactions/inputs and second the data request can only retrieve data from the virtual data base that is limited to storing data responsive to the context identified in the context access token.

As evident from the preceding description, the systems, methods and the like described herein represents an improvement in technology, specifically, data access security within a communications platform. Specifically, inputs provided at the communication platform are monitored/intercepted and cognitively analyzed to determine data requirements (i.e., a user/calling party and the purpose/context of the interaction). In response to determining the data requirements, data access rules are generated and/or retrieved and applied at an access gateway. As data requests as received from the user/called party from within the communications platform, the data access rules are applied to the request to determine if a match exists and, if so, data access rules-based access is provided to the data. In additional embodiments of the invention, the cognitive determination of the purpose/context of the interaction results in generation of a context access token that is communicated to a virtual database assembler, which assembles a virtual database that only contains data responsive to the context of the interaction. In such embodiments of the invention, once the data request has passed the first level of data access security (i.e., the data request matches the data access rules) the user/called party is provided access only to the data stored in the virtual database (i.e., the second level of data access security).

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing data access security to data stored within a data repository, the system comprising: a monitoring and cognitive analysis engine including a first memory and one or more first processing devices in communication with the first memory, wherein the first memory stores first instructions that are executable by the one or more first processing devices and configured to;
   monitor inputs provided at a communication platform,
   cognitively analyze the inputs to determine data requirements associated with the inputs,
   create or retrieve data access rules based on the data requirements,
   generate a context access token that identifies a context of the inputs, and
   initiate communication of (i) the data access rules to an access gateway and (ii) the context access token to a virtual database assembler; and
   the access gateway including a second memory and one or more second processing devices in communication with the second memory, wherein the second memory stores second instructions that are executable by the one or more second processing devices and configured to:
   receive the data access rules from the monitoring and cognitive analysis engine,
   in response to receiving a data request initiated at the communication platform for retrieving data from the data repository, determine whether the data request matches the data access rules, and
   in response to determining that the data request matches the data access rules, provide rule-based access to data associated with the data request from within the data repository; and
   the virtual database assembler including a third memory and one or more third processing devices in communication with the third memory, wherein the third memory stores third instructions that are executable by the one or more third processing devices and configured to:
   in response to receiving the context access token from the monitoring and cognitive analysis engine, dynamically assemble a virtual database that only stores data that is responsive to the context of the inputs.

2. The system of claim 1, wherein the second instructions configured to provide rule-based access to data associated with the data request are further configured to provide rule-based access to only data stored in the virtual database.

3. The system of claim 1, wherein first instructions configured to generate the context access token are further configured to generate a plurality of context access tokens, each token being generated based on a change in a context of the inputs during a communication session, and
   wherein the third instructions configured to assemble are further configured to dynamically assemble a plurality of virtual databases, each virtual database only storing data that is responsive to the context identified in the corresponding one of the plurality of context access tokens.

4. The system of claim 1, wherein at least one of the access gateway and the virtual database are stored in a fog server within an edge computing environment.

5. The system of claim 1, wherein the communication platform is a voice or text chat communication platform, and
wherein the first instructions configured to monitor are further configured to monitor by listening to the inputs, wherein the inputs are voice or text inputs provided by a calling party and a called party, and
wherein the data request is received from the called party based on information provided by the calling party.

6. The system of claim 5, wherein the first instructions configured to cognitively analyze the inputs are further configured to cognitively analyze the voice or text inputs to determine an identity of the calling party and at least one basis for the calling party to initiate a call with the called party.

7. The system of claim 1, wherein the communication platform is a mobile or web-based application, and wherein the first instructions configured to monitor are further configured to monitor the inputs provided by a user within the mobile application or web-based application.

8. The system of claim 1, wherein the second instructions are further configured to: in response to determining that the data request does not match the data access rules, deny access or request further authentication credentials to gain rule-based access to the data associated with the data request.

9. The system of claim 1, wherein the first instructions configured to monitor, cognitively analyze and create or retrieve data access rules and further configured to continuously monitor, cognitively analyze and create and retrieve data access rules throughout an entirety of a communication session.

10. A computer-implemented method for providing data access security to data stored within a data repository, the computer-implemented method is executable by one more processing devices and comprising:
monitoring inputs provided at a communication platform;
cognitively analyzing the inputs to determine data requirements associated with the inputs;
in response to cognitively analyzing the inputs, (i) generating a context access token that identifies a context of the inputs and (ii) creating or retrieving data access rules based on the data requirements;
dynamically assembling a virtual database that only stores data that is responsive to the context identified in the context access token;
in response to receiving a data request initiated at the communication platform for retrieving data from the data repository, determining whether the data request matches the data access rules; and
in response to determining that the data request matches the data access rules, providing rule-based access to data associated with the data request from within the data repository.

11. The computer-implemented method of claim 10, wherein providing rule-based access to data associated with the data request further comprises providing rule-based access to only data stored in the virtual database.

12. The computer-implemented method of claim 10, wherein the communication platform is a voice or text chat communication platform, and
wherein monitoring further comprises monitoring by listening to the inputs,
wherein the inputs are voice or text inputs provided by a calling party and a called party.

13. The computer-implemented method of claim 10, wherein the communication platform is a mobile or web-based application, and
wherein the monitoring further comprises monitoring the inputs provided by a user within the mobile application or web-based application.

14. A computer program product comprising non-transitory computer-readable code that includes set of codes for causing one or more computer processor devices to:
monitor inputs provided at a communication platform;
cognitively analyze the inputs to determine data requirements associated with the inputs;
in response to cognitively analyzing the inputs, (i) generate a context access token that identifies a context of the inputs and (ii) create or retrieve data access rules based on the data requirements;
dynamically assemble a virtual database that only stores data that is responsive to the context identified in the context access token;
in response to receiving a data request initiated at the communication platform for retrieving data from a data repository, determine whether the data request matches the data access rules; and
in response to determining that the data request matches the data access rules, provide rule-based access to data associated with the data request from within the data repository.

15. The computer program product of claim 14, wherein the set of codes for causing the one or more computer processor devices to provide rule-based access is further configured for causing the one or more computer processor devices to provide rule-based access to only data stored in the virtual database.

16. The computer program product of claim 14, wherein the communication platform is a voice or text chat communication platform, and
wherein the set of codes for causing the one or more computer processor devices to monitor is further configured for causing the one or more computer processor devices to monitor by listening to the inputs, wherein the inputs are voice or text inputs provided by a calling party and a called party.

17. The computer program product of claim 14, wherein the communication platform is a mobile or web-based application, and wherein the set of codes for causing the one or more computer processor devices to monitor is further configured for causing the one or more computer processor devices to monitor the inputs provided by a user within the mobile application or web-based application.

* * * * *